United States Patent [19]

Molina

[11] 4,353,569

[45] Oct. 12, 1982

[54] FREEWHEEL FLYWHEEL TRANSMISSION SYSTEM

[76] Inventor: Antonio F. Molina, 105-10 66th Ave., Apt. 3C, Forest Hills, N.Y. 11375

[21] Appl. No.: 942,423

[22] Filed: Sep. 14, 1978

[51] Int. Cl.³ .............................................. B62M 1/10
[52] U.S. Cl. .................................................... 280/217
[58] Field of Search .............. 180/33 C; 280/217, 215; 74/572

[56] References Cited

U.S. PATENT DOCUMENTS

| | | | |
|---|---|---|---|
| 1,258,431 | 3/1918 | Myers | 280/217 |
| 1,329,940 | 2/1920 | Wallace | 280/217 |
| 1,344,108 | 6/1920 | Willis | 280/217 |
| 1,612,739 | 12/1926 | Matsumoto | 280/217 |
| 2,141,233 | 12/1938 | Alexander | 280/217 |
| 3,493,066 | 2/1970 | Dooley | 74/572 |
| 4,037,854 | 7/1977 | Large | 280/217 |

*Primary Examiner*—Joseph F. Peters, Jr.
*Assistant Examiner*—Donn McGiehan

*Attorney, Agent, or Firm*—Jesus Sanchelima

[57] ABSTRACT

A freewheel flywheel transmission system for a bicycle capable of storing kinetic rotational energy, in which the flywheel properties are utilized with a minimum of moving parts and in which the energy of the user or the kinetic energy of the bicycle is stored or released in a very simple manner.

The transmission system includes a fixed axle and a hub shell rotatively supported by the axle. A flywheel and a first ratchet sprocket to which the energy of the user is applied are affixed to the hub shell. Second and third sprockets are rotatively supported on bearings by said hub shell. First and second clutches are used for engaging and disengaging second and third sprockets to their respective flywheel clutch faces enabling the user to transfer the energy so as to operate the vehicle in a plurality of modes as the power needs vary. Energy from second and third sprockets is transmitted through second and third transmission chains to fourth and fifth sprocket wheels attached to the rear drive wheel.

3 Claims, 2 Drawing Figures

FREEWHEEL FLYWHEEL TRANSMISSION SYSTEM

SUMMARY OF THE INVENTION

This system applies the flywheel velocity stabilization from the transmission, where the flywheel is placed to the engine and/or motor, and to the vehicle or machinery driven wheel, but also, and this is an outstanding feature, uses to the utmost the flywheel large rotational inertia by coupling this property to other features, like making the flywheel function as a freewheel flywheel and adding sprocket wheels and/or gears for easier performance and increasing power while conserving energy.

DETAILED DESCRIPTION OF PREFERRED EMBODIMENTS

Figure 1:
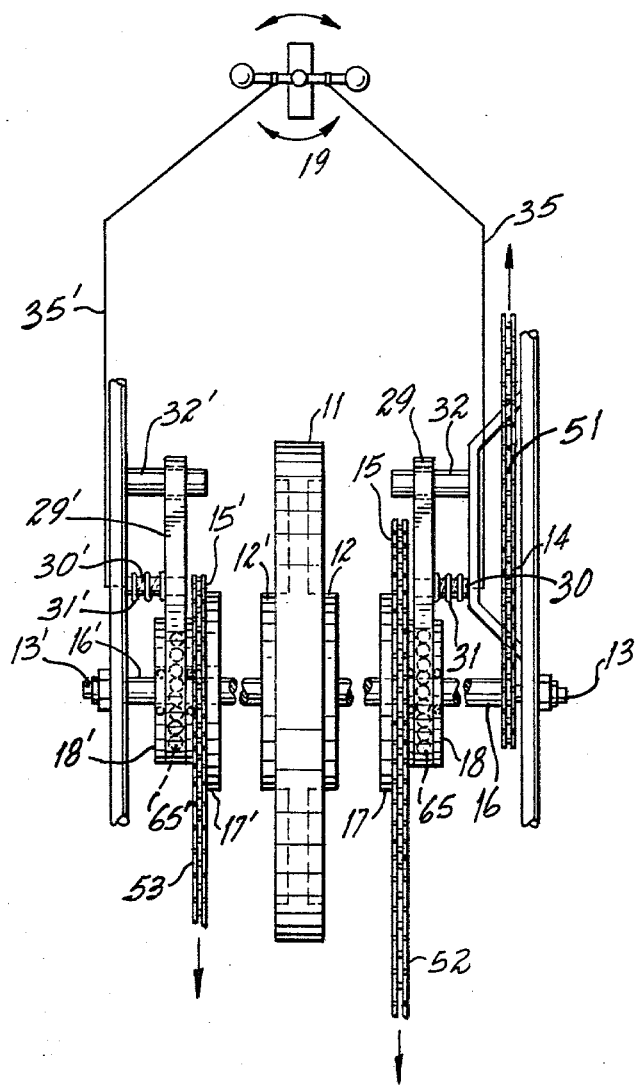
FIG. 1 is a front view showing the flywheel mounted on and attached to a freewheeling hub shell actioned by its sprocket wheel. On the axle hub shell, and at the flywheel right side a large, ball bearing mounted, sprocket wheel is actioned by a clutch assembly. This large sprocket is chain and/or gear linked to the vehicle driven wheel.
Figure 2:
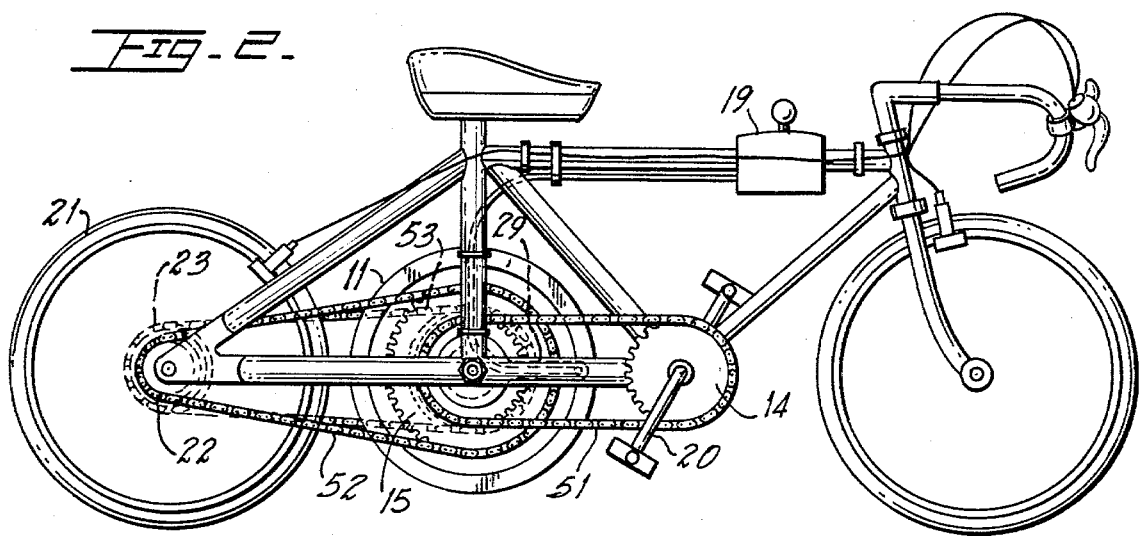
FIG. 2 is a side view of a bicycle showing the assembled freewheel flywheel transmission mounted in a proper way between the power source and the bicycle driven wheel, thereby showing that the freewheel flywheel is not a part of the power source but a part of the transmission system.

Referring now to FIGS. 1-2, there is shown a transmission assembly FIG. 1 comprised of a large flywheel 11 with two plate or clutch assemblies 12 one on each side of its hub, said flywheel mounted on and attached to a freewheeling axle hull shell 16 and made a part thereto. It is the function of clutch assembly 12 to engage and disengage flywheel 11 and a third sprocket means when needed. Said flywheel functioning, therefore, as a freewheel flywheel 11 to which all the power is applied through the freewheeling axle sprocket wheel 14, and chain linked to the power source shaft. All the power applied to the freewheel flywheel 11 plus the large rotational inertia and the speed stabilization effects are transmitted through an engaging large sprocket wheel 15, mounted on bearings on the freewheeling hub shell 16 rotating on axle 13, chain and/or gear linked to the vehicle driven wheel 21. In FIG. 2 the freewheeling hub shell 16 rotating on axle 13 is powered by human pedal 20 action; however, any other means like engine, motor or electric power source may be used. This arrangement clearly shows that the freewheeling flywheel 11 is not a part of the power source but a part of the transmission assembly in FIG. 1. Said assembly conveniently placed somewhere in the vehicle and/or machinery between the points of power source applied and their respective driven wheels, chain and-/or gear linked, as it may be the case, to both the power source drive shaft and the vehicle or machinery driven wheel, also shows that this arrangement stabilizes the whole system velocity.

The sprocket wheel 15, mounted on bearings on the freewheeling hub shell 16, has clutch assemblies 17-18 screwed on its right and left side and a hook and lever 19 to engage and disengage it to the freewheel flywheel 11 by slight side-way movements.

Clutch lever 19 moving from neutral to the right or left side alternately engages and disengages sprocket 15 and sprocket 15' to or away from their respective flywheel clutch faces 12 or 12' by the push-pull action on the cables connected to journaled hooks 29 and 29'. Each one of these hooks slides, longitudinally, on hub shell 16, on guiding posts 30 and 30' in a coil spring, 31 and 31', which normally projects the hook in the flywheel direction and on another pair of guiding posts, 32 and 32', rigidly affixed to the vehicle frame. These guiding posts, 32 and 32', maintain the hook alignment during the hook operations. The guiding posts, 30 and 30', in coil springs 31 and 31' are rigidly attached to the hooks on one end, while the other end to which the cables, 35 and 35', are connected, is guided by holes 38 in frame 39.

Therefore, in a bicycle FIG. 2, or the like equipped with a Freewheel Flywheel Transmission System when the pedals 20 move forward the sprocket wheel 14 will action the freewheeling hub shell 16 rotating on axle 13 and the freewheeling flywheel 11 and if the sprocket wheel 15, mounted on bearings on the freewheeling moving hub shell 16 rotating on axle 13 is engaged to the in-motion freewheeling flywheel 11 the vehicle will move forward. But once the sprocket wheel 15 is disengaged only the freewheeling flywheel 11 will be actioned by the applied power and thus the vehicle will coast along. At this time—and this is a most important feature—more power, with very little effort or energy consumption can be added to the spinning freewheel flywheel 11; said added power can be considered as stored energy within the freewheel flywheel large rotational inertia. Also, when the sprocket wheel 15 is disengaged and the vehicle is standing some power can be easily applied to the freewheel flywheel 11 to be used when so desired by simply engaging the spinning freewheel flywheel 11.

Another important feature of this freewheel flywheel transmission system FIG. 1, especially in the case of a bicycle and the like is the introduction of the different size sprocket wheels, such as the sprocket wheel 14 and the sprocket wheel 15, bearing mounted on the hub shell 16 rotating on axle 13 which, of course, provide a larger pace rate with less effort or energy consumption.

Basically, referring to FIG. 1, the rotational energy produced by pedal assembly 20 affixed to ratchet sprocket wheel 54 is transmitted through chain 51 to sprocket wheel 14 which is rigidly mounted on hub shell 16. Hub shell 16 freewheels on axle 13, and consequently, flywheel 11 also freewheels with respect to axle 13 since said flywheel is rigidly mounted on hub shell 16. As the rotational speed increases, the rotational energy stored in flywheel 11 also increases. Flywheel 11 may be engaged either by sprocket wheel 15 or sprocket wheel 15' through clutch assemblies 17-18 or 17'-18' with flywheel clutch plates 12 or 12', respectively. These clutch assemblies are provided with conventional high friction areas that are brought in contact to each other flywheel plate counterpart through hooks 29 and 29' depending on which direction lever 19 is activated by the user. Either hook, 29 or 29', will experience a slight synchronized, and in opposite direction, lateral displacement caused by lever 19 operation. Clutch assemblies 18 and 18' are journalled in hooks 29 and 29', respectively. Hooks 29 and 29' are provided with ball bearings 65 (in phantom). Sprocket wheels 15 and 15', mounted on bearings, (not shown in drawing) are both rigidly fastened to assemblies 17-18 and 17'-18', respectively, which in turn are mounted on hub shell 16, rotatable on axle 13, thereby making sprocket wheels 15 and 15' freewheel with respect to hub shell 16.

Any type of car disc brakes can be used to stop the freewheel flywheel while hand caliper brakes can be used for front and rear wheels in vehicles brakes like FIG. 2.

(1) Neutral positions:
  Clutch Assembly 17-18 Disengaged to clutch assembly 12
  Clutch Assembly 17'-18' Disengaged to clutch assembly 12'
(2) Clutch Assembly 17-18 Engaged to clutch assembly 12
(3) Clutch Assembly 17'-18' Engaged to clutch assembly 12'

In the first combination the neutral positions are in effect, pedalling the bike the crank moves the sprocket which in turn rotate the hub shell sprocket wheel 14 and effects a simultaneous rotation of freewheeling hub shell 16 and flywheel 11, but since clutch face 12 is not engaged by clutch assembly 17-18 and clutch assembly 17'-18' is not engaging clutch face 12' the flywheel is spinning, consequently, storing energy while the vehicle stands still.

When the second combination is in effect power is being transmitted to the tractive wheel by sprocket 15 engaged to clutch face 12. In this combination sprocket 15' is disengaged to flywheel clutch face 12', in fact is farther away than in position #1.

When the third combination is in effect power is being transmitted to the driven wheel by sprocket 15' engaged to clutch face 12'. In this combination sprocket 15 is disengaged to flywheel clutch assembly 12, and is in fact farther away from face 12 than in position No. 1.

In the second and third combinations the vehicle will move forward but at different gear ratios since sprockets 15 and 15' will have different diameters, which will also be the case with the sprockets 22 and 23 in their driven wheel or wheels sides, to which they are linked by transmission means 52 and 53.

The invention hereinabove described may be varied in construction within the scope of the claims, for the particular assembly selected to illustrate the invention is but one of many possible embodiments and applications of the same. It is readily apparent that alterations and modifications can be resorted to without departing from the scope of this invention and such alterations and modifications are intended to be included within the scope of the appended claims. The invention therefore is not to be restricted to the precise details of the structure shown and described.

What is claimed is:
1. An inertia vehicle, comprising:
  (a) a frame;
  (b) an axle supported by said frame;
  (c) a hub shell rotatively supported by said axle;
  (d) a flywheel rigidly mounted on said hub shell;
  (e) first sprocket means rigidly mounted on said hub shell;
  (f) power means for rotating said first sprocket means;
  (g) second sprocket means, having a diameter greater than the diameter of said first sprocket means, rotatively supported on bearings by said hub shell, and positioned adjacent to said flywheel right side,
  (h) first clutch means for engaging and disengaging said second sprocket means and said flywheel;
  (i) third sprocket means, having a diameter smaller than said second sprocket means, rotatively supported on bearings by said hub shell; positioned adjacent to said flywheel left side;
  (j) second clutch means for engaging and disengaging said third sprocket means and said flywheel;
  (k) a driven wheel rotatively supported by said frame, including fourth and fifth sprocket means mounted at right and left sides on the axle of said driven wheel, and further having first and second transmission means for coupling the rotation of said second and third sprocket means, respectively, to said fourth and fifth sprocket means, whereby activation and de-activation of said first and second clutch means enables the transmission of rotational movement from said flywheel to said fourth and fifth sprocket means.

2. The vehicle set forth in claim 1, wherein said power means further comprises;
  (m) a crank having opposed pedal means pivotally secured thereto so that alternating depression of said pedal means rotates said crank;
  (n) sixth sprocket means fixedly secured to said crank means so that rotation of said crank effects a simultaneous and corresponding rotation of said first sprocket means;
  (o) first transmission means for coupling the rotation of said sixth sprocket means to said first sprocket means.

3. The vehicle set forth in claim 2, wherein said vehicle is a bicycle.

* * * * *